United States Patent
Park

(10) Patent No.: US 8,977,416 B2
(45) Date of Patent: Mar. 10, 2015

(54) ELECTRIC VEHICLE AND METHOD FOR CONTROLLING EMERGENCY THEREOF

(75) Inventor: Sung Chul Park, Incheon (KR)

(73) Assignee: LG Electronics Inc., Seoul (KR)

( * ) Notice: Subject to any disclaimer, the term of this patent is extended or adjusted under 35 U.S.C. 154(b) by 39 days.

(21) Appl. No.: 13/809,145

(22) PCT Filed: Jul. 8, 2011

(86) PCT No.: PCT/KR2011/005036
§ 371 (c)(1),
(2), (4) Date: Jan. 8, 2013

(87) PCT Pub. No.: WO2012/005552
PCT Pub. Date: Jan. 12, 2012

(65) Prior Publication Data
US 2013/0116876 A1    May 9, 2013

(30) Foreign Application Priority Data

Jul. 9, 2010    (KR) .................. 10-2010-0066337
Aug. 2, 2010    (KR) .................. 10-2010-0074742
Aug. 2, 2010    (KR) .................. 10-2010-0074756

(51) Int. Cl.
*B60L 9/00*    (2006.01)
*B60L 15/12*    (2006.01)
*B60L 3/00*    (2006.01)
*G07C 5/08*    (2006.01)

(52) U.S. Cl.
CPC . *B60L 15/12* (2013.01); *B60L 3/00* (2013.01); *B60L 3/0084* (2013.01); *B60L 3/0092* (2013.01); *G07C 5/08* (2013.01); *B60L 3/0015* (2013.01)
USPC .......................................................... 701/22

(58) Field of Classification Search
CPC ............ B65H 2220/01; B60W 50/02; B60W 2710/083; B60L 3/0023

USPC .......................................................... 701/22
See application file for complete search history.

(56) References Cited

U.S. PATENT DOCUMENTS

2011/0288699 A1* 11/2011 Jang et al. .................. 701/22

FOREIGN PATENT DOCUMENTS

| CN | 103108770 | * | 7/2011 |
| JP | 08-242505 A | | 9/1996 |
| JP | 10-023601 A | | 1/1998 |
| JP | 10-077888 A | | 3/1998 |
| JP | 2000-287484 A | | 10/2000 |
| KR | 10-2009-0100580 A | | 9/2009 |

OTHER PUBLICATIONS

International Search Report from related International Application No. PCT/KR2011/005036.

* cited by examiner

*Primary Examiner* — James Trammell
*Assistant Examiner* — Michael D Lang
(74) *Attorney, Agent, or Firm* — McKenna Long & Aldridge LLP

(57) ABSTRACT

An electric vehicle includes a sensor unit for measuring a vehicle state, an interface unit for receiving vehicle control setting parameters from a vehicle driver, a main controller for operating and controlling the electric vehicle in response to input data from the sensor unit and the interface unit, and a sub controller for diagnosing the main controller in response to state information and driving information received from the main controller, and performing emergency control of the vehicle when a malfunction occurs in the main controller, instead of the main controller, The sub controller, under the emergency control, controls acceleration and deceleration of the vehicle, establishes a limit range of speed and torque of the vehicle, and controls the vehicle to be driven within the limit range.

22 Claims, 9 Drawing Sheets

(a)

(b)

ELECTRIC VEHICLE AND METHOD FOR CONTROLLING EMERGENCY THEREOF

TECHNICAL FIELD

The present invention relates to an electric vehicle and a method for controlling an emergency state thereof, and more particularly to an electric vehicle for detecting an abnormal state of a controller configured to control overall operations of the vehicle such that the electric vehicle operates in an emergency mode or stops operating, and a method for controlling an emergency state of the electric vehicle.

BACKGROUND ART

Electric vehicles (EVs) have been actively studied because they are the most promising solution to pollution and energy problems.

Electric vehicles (EVs) are mainly powered by driving an AC or DC motor using power of a battery. The electric vehicles are broadly classified into battery powered electric vehicles and hybrid electric vehicles. In the battery powered electric vehicles, a motor is driven using power of a battery, and the battery is recharged after stored power is completely consumed. In hybrid electric vehicles, a battery is charged with electricity generated via engine driving, and an electric motor is driven using the electricity to realize vehicle movement.

The hybrid electric vehicles may further be classified into serial type ones and parallel type ones. In the case of serial hybrid electric vehicles, mechanical energy output from an engine is changed into electric energy via a generator, and the electric energy is fed to a battery or motor. Thus, the serial hybrid electric vehicles are always driven by a motor similar to conventional electric vehicles, but an engine and generator are added for the purpose of increasing range. Parallel hybrid electric vehicles may be driven using two power sources, i.e. a battery and an engine (gasoline or diesel). Also, the parallel hybrid electric vehicles may be driven using both the engine and the motor according to traveling conditions.

With recent gradual development of motor/control technologies, small high-output and high-efficiency systems have been developed. Owing to replacing a DC motor by an AC motor, electric vehicles have accomplished considerably enhanced output and power performance (acceleration performance and maximum speed) comparable to those of gasoline vehicles. As a result of promoting a higher output and higher revolutions per minute, a motor has achieved reduction in weight and size, and consequently reduction in the weight and size of a vehicle provided with the motor.

Although the electric vehicle includes a controller such as a central processing unit (CPU) configured to control functions thereof, assuming that the controller malfunctions or the electric vehicle has difficulty in communicating with the controller, it is impossible for the electric vehicle to operate normally due to malfunction of the controller.

Therefore, if a malfunction occurs in vehicle traveling, it is impossible to process input signals, such that it becomes difficult to perform vehicle traveling, resulting in occurrence of an unexpected accident.

DISCLOSURE

Technical Problem

Therefore, the present invention has been made in view of the above problems, and an object of the present invention is to provide an electric vehicle and a method for controlling an emergency state thereof, wherein the electric vehicle includes a plurality of controllers (e.g., a main ECU and a sub ECU) for vehicle control, determines the presence or absence of a malfunction by mutually monitoring the controllers and performs emergency driving or stops driving if the presence of a malfunction is determined, such that stable driving is guaranteed and thus the electric vehicle is driven in an emergency mode using a sub-controller instead of an abnormal main-controller.

Another object of the present invention is to provide an electric vehicle and a method for controlling an emergency state thereof, wherein the electric vehicle having a plurality of processors for vehicle control enables the same signal to be applied to each processor without generating a separate signal, determines whether an input signal is normal or abnormal, and thus stably performs vehicle control.

Technical Solution

In accordance with one aspect of the present invention, the above and other objects can be accomplished by an electric vehicle including: a sensor unit for measuring a vehicle state; an interface unit for receiving vehicle control setting parameters from a vehicle driver; a main controller for operating and controlling the electric vehicle in response to input data from the sensor unit and the interface unit; and a sub controller for diagnosing the main controller in response to state information and driving information received from the main controller, and performing emergency control of the vehicle when a malfunction occurs in the main controller, instead of the main controller.

The electric vehicle further includes: a motor control unit for allowing the vehicle to travel by controlling a motor; and a power relay assembly (PRA) for providing battery power to the motor control unit, wherein, if a malfunction occurs in the motor control unit, the main controller and the sub controller control the power relay assembly (PRA) so as to prevent the battery power from being applied to the motor control unit, such that the vehicle performs emergency stop.

The electric vehicle may further include: a distortion compensator for compensating for distortion of signals received from a plurality of sensors contained in the sensor unit in such a manner that the same signal is input to the main controller and the sub controller.

In accordance with another aspect of the present invention, a method for performing emergency control of an electric vehicle includes: diagnosing a state of the main controller upon receiving state information and driving information from the main controller configured to control the vehicle; transmitting, upon diagnosing that the main controller normally operates, a monitoring result to the main controller; and establishing emergency control, upon diagnosing that a malfunction occurs in the main controller, and performing vehicle control without using the main controller.

In accordance with another aspect of the present invention, a method for performing emergency control of an electric vehicle includes: generating, by each of the main controller and the sub controller, control information for vehicle control according to input data from at least one sensor, and outputting the generated control information to a motor control unit; determining whether a malfunction occurs in the motor control unit according to whether there is a response from the motor control unit; and if a malfunction occurs in the motor control unit, cutting off power supplied to the motor control unit through power relay assembly (PRA) control such that the vehicle performs emergency stop.

Advantageous Effects

In accordance with the embodiments of the present invention, the electric vehicle includes a plurality of controllers so as to perform mutual monitoring between the controllers, compares a variety of generated data although all the controllers are normally operated, performs emergency driving or stops driving, guarantees stable traveling by minimally controlling necessary operations, and prevents the occurrence of an unexpected problem in advance, resulting in a guarantee of a vehicle driver's safety.

In order to verify states of one signal and one signal unit in association with a plurality of controllers, it is not necessary to add a plurality of signals to the controllers, a single signal can be repeatedly input through internal setting and simple circuit design of the controller, and a signal difference can be minimized, resulting in increased stability of vehicle control. In addition, since a plurality of signal units is not used for signal generation, there is no difference between individual signal units, resulting in increased accuracy of data. As a result, a circuit layout or space for the electric vehicle is reduced, resulting in reduction of production costs.

BEST MODE

Embodiments of the present invention will be described below with reference to the attached drawings.

Figure 1:
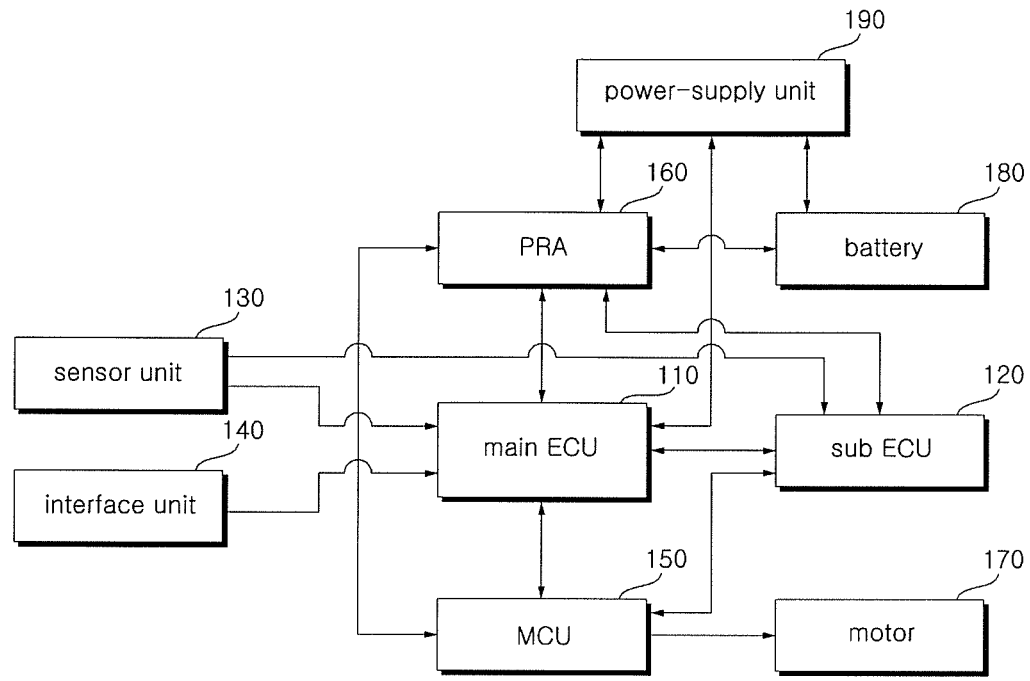
FIG. 1 is a block diagram illustrating constituent components of an electric vehicle according to an embodiment of the present invention.

FIG. 1 is a block diagram illustrating constituent components of an electric vehicle according to an embodiment of the present invention.

Referring to FIG. 1, the electric vehicle according to an embodiment of the present invention includes a sensor unit 130, an interface unit 140, a motor control unit (MCU) 150, a motor 170, a battery 180, a power relay assembly (PRA) 160, a power-supply unit 190, a main controller 110 denoted by a main ECU (Electronic Circuit Unit) configured to control vehicle traveling and overall operations, and a sub controller 120 denoted by a sub ECU 120 configured to assist the main MCU.

The electric vehicle includes the battery 180, operates using power charged in the battery 180, and charges the battery 180 upon receiving power from a charging station, a vehicle charging installation, a home or an external part.

The battery 180 includes a plurality of high-voltage battery cells.

In this case, the electric vehicle further includes a battery management system (BMS) (not shown). The BMS controls a charging operation of the battery 180, determines the remaining battery capacity and the presence or absence of charging necessity, and performs a management operation for providing the charging current stored in the battery 180 to each part of the electric vehicle.

When charging and using the battery, the BMS maintains a regular voltage difference between cells of the battery, and controls the battery not to be overcharged or overdischarged, resulting in increased battery lifespan.

A Power Relay Assembly (PRA) 160 includes a plurality of relays and a sensor to perform switching of a high voltage, so that it receives an operating power of a high voltage from the battery 180, and applies the received power to the MCU 150 or prevents the received power from being applied to the MCU 150. In this case, the PRA 160 operates the relays upon receiving a control command from the main ECU 110, and the relays may operate upon receiving a control command from the sub ECU 120.

When the vehicle starts or stops driving, the PRA 160 switches a plurality of relays according to a predetermined order upon receiving a control command from the main ECU 110 or the sub ECU 120, such that the operating power of a high voltage stored in the battery 180 can be applied to individual parts of the vehicle.

The PRA 160 prevents battery power from being applied to the MCU 150, and also prevents power from being applied to the motor 170, such that the motor 180 stops operation and thus the vehicle also stops driving.

The sensor unit 130 detects signals generated when the vehicle runs or performs a predetermined operation, and inputs the detected signals to the main ECU 110 and the sub ECU 120.

The sensor unit 130 includes a plurality of sensors inside or outside of the vehicle so that it can detect a variety of signals. In this case, different types of sensors may be used according to installation positions. Specifically, the sensor unit 130 applies a signal for controlling an accelerator or brake needed for emergency control to the sub ECU 120.

The interface unit 140 includes an input unit including a plurality of switches configured to input a predetermined signal by a vehicle driver's manipulation, and an output unit for outputting current operation state information of the electric vehicle.

The output unit includes a display for displaying information; a speaker for outputting music, sound effects, and warning sounds; and various state indicator lamps, etc. The input unit includes a plurality of switches and a plurality of buttons to operate a turn signal, a tail lamp, a head lamp, brushes, etc.

The interface unit 140 includes manipulators such as a steering wheel, an accelerator, a brake, etc. Specifically, the output unit outputs at least one of a warning sound, a warning light, a warning message, etc. when the main ECU 110 or the sub ECU 120 malfunctions, so that the vehicle driver can recognize the occurrence of malfunction.

The MCU 150 generates a control signal for driving at least one motor 170 connected thereto, generates a predetermined signal for controlling the motor 170, and applies the generated signal to the motor 170. In this case, the MCU 150 includes an inverter (not shown) and a converter (not shown), so that it can control the motor 170 by controlling the inverter or converter.

The MCU 150 operates by a control command received from the main ECU 110 or the sub ECU 120, and controls the motor 170 using battery power provided through the PRA 160.

The MCU 150 operates upon receiving torque information from the main ECU 110 and the sub ECU 120, operates using torque information of the main ECU 110 during a normal mode, and operates torque information of the sub ECU 120 when a faulty mode occurs in the main ECU 110.

The power-supply unit 190 charges the battery with power received from an external part, and provides overall parts of the vehicle including the motor 170 with the battery power acting as the operating power.

The main ECU 110 generates a predetermined command and applies the command to the MCU 150 in a manner that operations corresponding to input signals of the interface unit 140 and the sensor unit 130 can be carried out, so that the main ECU 110 controls the operation state to be displayed by controlling input/output (I/O) of data.

The sub ECU 120 is connected to the main ECU 110 so as to receive I/O signals from the main ECU 110, and monitors the main ECU 110. In this case, the sub ECU 120 determines whether the main ECU 110 normally operates in response to values, formats, and I/O time of the I/O signals.

If a fault occurs in the main ECU 120, the sub ECU 120 operates as a backup controller instead of the main ECU 120. That is, the sub ECU 120 controls the motor 170 and the electric vehicle using input data.

The main ECU 110 and the sub ECU 120 calculate torque information to be applied to the MCU 150 on the basis of input signals from the sensor unit 130, so that the calculated data is communicated between the main ECU 110 and the sub ECU 120. In addition, each of the main ECU 110 and the sub ECU 120 transmits the calculated data to the MCU 150.

The main ECU 110 and the sub ECU 120 transmit the result calculated on the basis of input data, perform mutual monitoring therebetween, and compare the received data with self-calculated data, thereby determining the presence or absence of a fault.

The main ECU 110 and the sub ECU 120 are configured to mutually transmit data at intervals of a predetermined time. If data is not received in the main ECU 110 or the sub ECU 120 for a predetermined time or more, this means that a fault has occurred in the main ECU 110 or the sub ECU 120. In addition, even when d the main ECU 110 or the sub ECU 120 malfunctions, the main ECU 110 or the sub ECU 120 may determine the presence of a malfunction in the counterpart ECU.

In this case, the main ECU 110 and the sub ECU 120 may determine whether the counterpart ECU stops operation through mutual data exchange, or malfunctions while in motion.

If the sub ECU 120 does not operate, the main ECU 110 determines the presence of a malfunction in the sub ECU 120, so that the main ECU 110 outputs a warning message indicating the malfunction of the sub ECU 120 through the output unit of the interface unit 140, thereby maintaining vehicle driving.

The main ECU 110 transmits a signal indicating malfunction of the sub ECU 120 to the MCU 150, so that it controls the MCU 150 to disregard the signal of the sub ECU 120.

If the main ECU 110 does not operate, the sub ECU 120 determines the presence of a malfunction in the main ECU 110, so that it operates as a backup controller in place of the main ECU 120. That is, the sub ECU 120 controls the motor 170 and the electric vehicle using input data.

If the fault or malfunction occurs in the main ECU 110, the sub ECU 120 immediately performs emergency control using pre-calculated torque information. Accordingly, if the fault or malfunction occurs in the main ECU 110 during vehicle traveling, emergency control of the sub ECU 120 is carried out, so that the sub ECU 120 can control the electric vehicle to maintain a current running state without stopping the electric vehicle.

When driving the motor 170, the sub ECU 120 limits speed or torque of the motor 170 to a predetermined speed or torque, so that it controls the motor 170 to operate within a limited range. The sub ECU 120 limits the speed in response to not only a vehicle state under emergency control but also a value of input data from the sensor unit 130, and controls an accelerator or brake in response to the limited speed. That is, the sub ECU 120 is configured to process minimum operations such as vehicle driving, etc.

The sub ECU 120 is provided to back up the main ECU 110, and activates only some functions instead of all operations of the main ECU 110 in such a manner that the electric vehicle can be driven in an emergency mode. The sub ECU 120 may be composed of lower-performance components than those of the main ECU 110, or may be composed of the same-performance components as those of the main ECU 110.

If emergency control starts, the sub ECU 120 maintains emergency driving of the vehicle through emergency control until the electric vehicle is powered off. Thereafter, when the electric vehicle restarts driving after being powered off, the sub ECU 120 determines whether the main ECU normally operates, so that it releases or maintains emergency control.

If emergency control starts, the sub ECU 120 controls the output unit of the interface unit 140 to display a warning message indicating faulty operation of the main ECU 110.

The sub ECU 120 outputs a signal indicating the faulty operation of the main ECU 110 to the MCU 150, so that it controls the MCU 150 to disregard the signal from the main ECU 110.

In addition, the main ECU 110 or the sub ECU 120 compares data received from the counterpart ECU with the calculated torque information. If a difference between the calculated values obtained by the comparison result is equal to or higher than a predetermined value, this means that a malfunction has occurred in both the main ECU 110 and the sub ECU 120, so that an operation stop command is applied to the MCU 150. In this case, an error within a predetermined range is determined to be normal.

The MCU 150 receives torque information from both the main ECU 110 and the sub ECU 120, compares the received torque information with each other, and controls the motor 170 on the basis of torque information of the main ECU 110 according to the result of comparison.

If torque information of the main ECU 110 is different from that of the sub ECU 120, or if the MCU 150 receives the operation stop command from the main ECU 110 or the sub ECU 120, the MCU 150 stops driving the motor by stopping control of the motor.

In response to the operation stop command, the MCU 150 controls the motor to be gradually decelerated instead of immediately stopping driving of the motor, so that the motor stops operation.

Meanwhile, the main ECU 110 and the sub ECU 120 monitor the operation state of the MCU 150 on the basis of data received from the MCU 150 in such a manner that the presence or absence of a malfunction in the main ECU 110 or the sub ECU 120 is determined.

If the presence of a malfunction in the MCU 150 is determined (for example, after a predetermined command is applied to the MCU 150, if a response to the command is not received or an operation not corresponding to the command is performed), the main ECU 110 or the sub ECU 120 determines the presence of a malfunction in the MCU 150, so that the MCU 150 stops operation.

In this case, the main ECU 110 or the sub ECU 120 transmits a cut-off command to the PRA 160 on the condition that the MCU 150 has a malfunction, such that it cuts off battery power provided to the MCU 150 through switching of the PRA 160.

Accordingly, if it is impossible to control the MCU 150 due to a malfunction of the MCU 150, supply power is cut off so that the MCU 150 stops operation.

Figure 2:
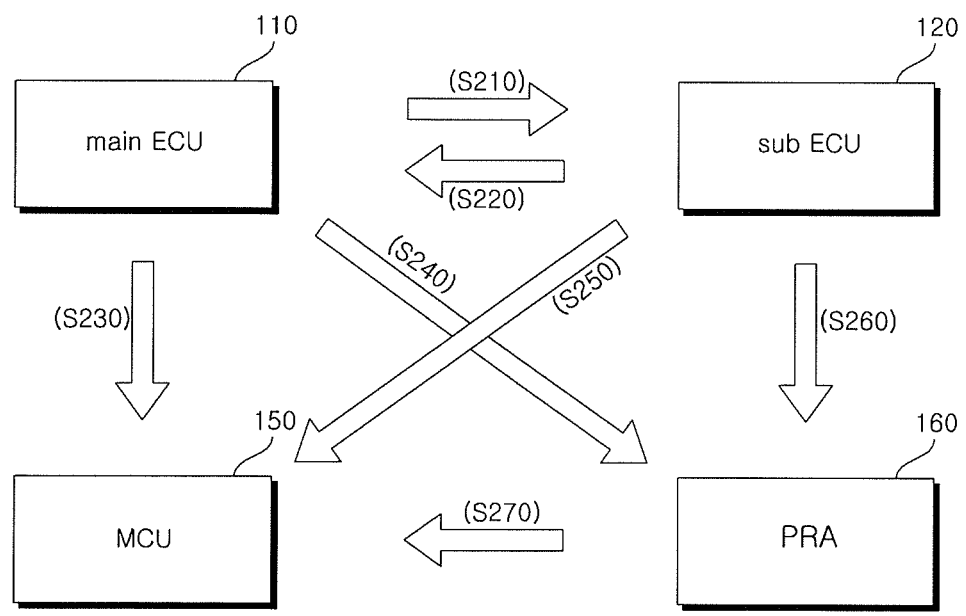
FIG. 2 is a conceptual diagram illustrating a method for controlling an electric vehicle through mutual monitoring and a method for providing emergency control to the electric vehicle according to an embodiment of the present invention.

FIG. 2 is a conceptual diagram illustrating a method for controlling an electric vehicle through mutual monitoring and a method for providing emergency control to the electric vehicle according to an embodiment of the present invention.

As described above, the main ECU 110 and the sub ECU 120 mutually monitor their operation states so as to determine the presence of a malfunction, and determine a current state of the MCU 150 so that the electric vehicle keeps driving or stops driving.

As can be seen from FIG. 2, the main ECU 110 performs overall functions for vehicle control, and applies state information and driving information to the sub ECU 120 in step S210.

The sub ECU 120 analyzes data received from the main ECU 110 so as to perform a diagnostic function of the main ECU 110, and outputs the monitoring result to the main ECU in step S220.

The sub ECU 120 calculates torque information for motor control in response to an input signal from the sensor unit 130, and outputs the calculated result to the main ECU 110.

Therefore, each of the main ECU 110 and the sub ECU 120 determines whether a state controller operates normally. If any one of the main ECU 110 and the sub ECU 120 does not operate, the operating ECU from among the main ECU 110 and the sub ECU 120 controls vehicle driving, and outputs associated signals to the MCU 150 in steps S230 and S250. Specifically, if the main ECU 110 does not operate, the sub ECU 120 performs emergency driving.

In addition, the main ECU 110 and the sub ECU 120 compare their calculated torque information with each other, and mutually determine whether the counterpart ECU has a malfunction. If torque information of the main ECU 110 is different from that of the sub ECU 120, this means the occurrence of a malfunction, such that the main ECU 110 or the sub ECU 120 outputs the operation stop command to the MCU 150 in step S230 or S250, respectively.

If the operation stop command is applied to the MCU 150, or if torque information of the main ECU 110 is different from that of the sub ECU 120, it is impossible for the MCU 150 to determine which ECU is in a normal mode, so that the MCU 150 controls the motor to stop the vehicle.

Meanwhile, if a malfunction occurs in the MCU 150, the main ECU 110 or the sub ECU 120 outputs a cut-off control command to the PRA 160 in step S240 or S260, the PRA 160 cuts off power supply to the MCU 150 in response to a control command from the main ECU 110 or the sub ECU 120 in step S270.

In other words, if any one of the main ECU 110 and the sub ECU 120 stops operation, the normally operating ECU from among the main ECU 110 and the sub ECU 120 performs vehicle control. If the main ECU 110 stops operation, the sub ECU 120 performs emergency control of the vehicle. If the sub ECU 120 stops operation, the main ECU 110 remains in normal control.

On the other hand, although both the main ECU 110 and the sub ECU 120 operate, if there is a high difference in calculated values between the main ECU 110 and the sub ECU 120, or if the MCU 150 malfunctions, the electric vehicle stops driving.

Figure 3:
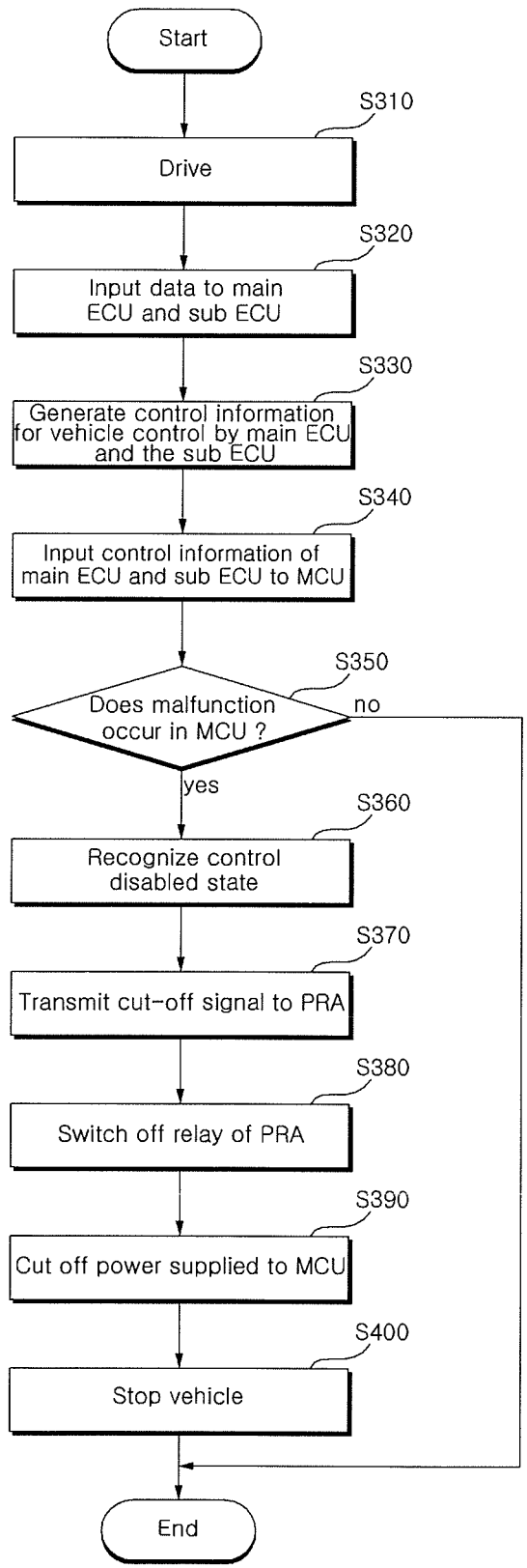
FIG. 3 is a flowchart illustrating a method for providing emergency control to an abnormal MCU according to an embodiment of the present invention.

FIG. 3 is a flowchart illustrating a method for providing emergency control to an abnormal MCU according to an embodiment of the present invention.

Referring to FIG. 3, when the electric vehicle is running in step S310, the sensor unit 130 including a plurality of sensors measures a vehicle state using the sensors, and outputs the measured vehicle state to the main ECU 110 and the sub ECU 120 in step S320.

The main ECU 110 displays information of input data through the output unit of the interface unit 140, such that a vehicle driver can recognize a current driving state of the vehicle.

The main ECU 110 and the sub ECU 120 generate control information for vehicle control on the basis of data received from the sensors in step S330. For example, the main ECU 110 and the sub ECU 120 calculate torque information for motor control.

The main ECU 110 and the sub ECU 120 are configured to output the generated control information to the MCU 150, or perform mutual monitoring therebetween through mutual transmission of the control information. A method for determining the presence or absence of a malfunction through mutual monitoring between the main ECU 110 and the sub ECU 120 is shown in FIG. 2.

If control information transmitted from the main ECU 110 is different from control information transmitted from the sub ECU 120, the operation stop command is applied to the MCU 150. In this case, the main ECU 110 and the sub ECU 120 determine the presence or absence of a malfunction in the MCU 150 in response to an output signal of the MCU 150 in step S350.

If a malfunction occurs in the MCU 150, the main ECU 110 and the sub ECU 120 recognize this MCU state as a control disabled state in step S360.

Each of the main ECU 110 and the sub ECU 120 transmits a cut-off signal to the PRA 160 so that it can turn off the relay of the PRA 160 in step S380.

Since the relay of the PRA 160 is turned off, battery power supplied to the MCU 150 is cut off in step S390 and the MCU 150 stops operation so that the vehicle also stops operation in step S410.

Therefore, if it is impossible to control the main ECU 110 and the sub ECU 120 due to malfunction of the MCU 150, power supplied to the MCU is cut off and emergency control of the vehicle is performed so that the vehicle can safely stop, resulting in prevention of an accident caused by a control disabled state.

Figure 4:
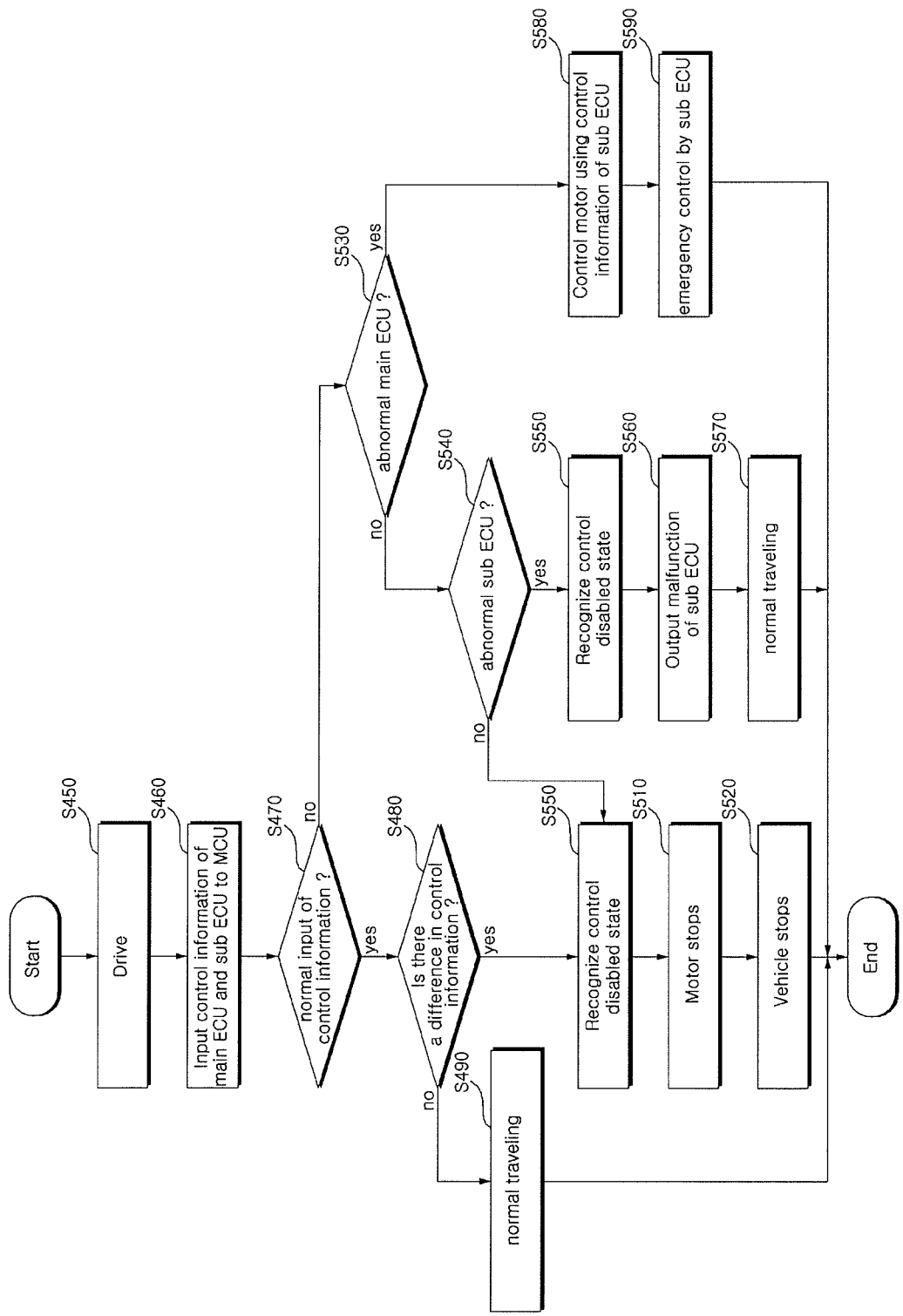
FIG. 4 is a flowchart illustrating a method for performing emergency control of an abnormal electric vehicle according to an embodiment of the present invention.

FIG. 4 is a flowchart illustrating a method for performing emergency control of an abnormal electric vehicle according to an embodiment of the present invention.

Referring to FIG. 4, when the electric vehicle is running in step S450, the sensor unit 130 including a plurality of sensors measures a vehicle state using the sensors, and outputs the measured vehicle state to the main ECU 110 and the sub ECU 120 in step S460. The main ECU 110 outputs a current driving state of the vehicle, and controls overall operations of the vehicle.

The main ECU 110 and the sub ECU 120 generate control information for vehicle control on the basis of data received from the sensors, output the generated control information to the MCU 150, and control the motor in response to the control information.

The control information is communicated between the main ECU 110 and the sub ECU 120 so that mutual monitoring between the main ECU 110 and the sub ECU 120 is performed. Control information generated from the main ECU 110 is compared with control information generated from the sub ECU 120, so that the main ECU 110 and the sub ECU 120 can determine whether a malfunction has occurred in the counterpart ECU.

In addition, each of the main ECU 110 and the sub ECU 120 transmits the generated control information to the MCU 150, such that the main ECU 110 receives the control information from the sub ECU 120 and the sub ECU 120 receives the control information from the main ECU 110.

In this case, the MCU 150 determines whether control information is normally received from the main ECU 110 and the sub ECU 120 in step S470. If control information is normally input to the MCU 150, the MCU 150 compares the control information received from the main ECU 110 with the control information received from the sub ECU 120.

If control information received from the main ECU 110 is identical to control information received from the sub ECU 120, this means that the main ECU 110 and the sub ECU 120 are normally operated and the vehicle can be normally driven in step S490. In this case, if an error in control information between the main ECU 110 and the sub ECU 120 is less than a predetermined value, the MCU 150 determines that the control information of the main ECU 110 is identical to the control information of the sub ECU 120.

Meanwhile, if control information of the main ECU 110 is different from control information of the sub ECU 120, the MCU 150 determines that at least one of the main ECU 110 and the sub ECU 120 has malfunctioned. However, since it is impossible for the MCU 150 to determine which one of the main ECU 110 and the sub ECU 120 has malfunctioned, the MCU 150 determines this situation as a control disabled state in step S500.

The MCU 150 stops driving the motor 170 according to control information of the main ECU 110 and the sub ECU 120 in step S510.

As a result, the electric vehicle stops moving in step S520. In this case, the MCU 150 controls the motor to be gradually decelerated instead of immediately stopping the motor, so that the motor stops operation.

Before the electric vehicle stops moving by the MCU 150, even in the case in which control information of the main ECU 110 is compared with control information of the sub ECU 120 through data communication between the main ECU 110 and the sub ECU 120, if the control information of the main ECU 110 is different from the control information of the sub ECU 120, at least one of the main ECU 110 and the sub ECU 120 outputs an operation stop command to the MCU 150.

Upon receiving the operation stop command from any one of the main ECU 110 and the sub ECU 120, the MCU 150 controls the motor as described above so that the vehicle is gradually decelerated and stops in steps S510 and S520.

On the other hand, if control information from the main ECU 110 and control information from the sub ECU 120 are abnormally input to the MCU 150, or if it is determined that any one of the main ECU 110 and the sub ECU 120 does not transmit data on the basis of the result of data communication between the main ECU 110 and the sub ECU 120, it is determined that at least one of the main ECU 110, the sub ECU 120 and the MCU 150 has malfunctioned.

If the main ECU 110 has malfunctioned in step S530, the MCU 150 immediately controls the motor using torque information pre-calculated by the sub ECU 120 in step S580.

If the sub ECU 120 does not receive control information from the main ECU 110, or if the sub ECU 120 receives a signal indicating malfunction of the main ECU 110 from the MCU 150, the sub ECU 120 determines that the main ECU 110 has a malfunction so that it does not operate.

The sub ECU 120 generates control information including torque information in response to an input signal and outputs the generated data to the MCU 150 so as to perform emergency control of the motor, so that the electric vehicle starts operating in an emergency driving mode in step S590.

In this case, the emergency driving activated by the sub ECU 120 relates to acceleration and deceleration of the vehicle. If emergency control of the vehicle starts, an emergency control state is maintained until the vehicle stops moving.

Meanwhile, although the main ECU 110 normally operates, if a malfunction occurs in the sub ECU 120, the MCU 150 controls the motor on the basis of control information of the MCU 110.

The main ECU 110 maintains a conventional operation state in step S550, and outputs a warning message indicating malfunction of the sub ECU 120 in step S560.

The MCU 110 maintains normal driving of the vehicle in step S570.

On the other hand, although control information is not normally input to the MCU 150, if the main ECU 110 and the sub ECU 120 are normally operated, this means either that both the main ECU and the sub ECU are operating abnormally as shown in FIG. 3 or that the MCU 150 has a malfunction.

Therefore, according to the electric vehicle and an emergency control method thereof, states of a plurality of controllers (i.e., ECUs) are periodically checked. If any one of the ECUs abnormally operates, the normally operating ECU controls the vehicle to operate in an emergency driving mode. In addition, the electric vehicle according to the present invention may be driven in an emergency driving mode or may stop driving in an emergency stop mode according to an abnormal state, resulting in prevention of accidents.

Figure 5:
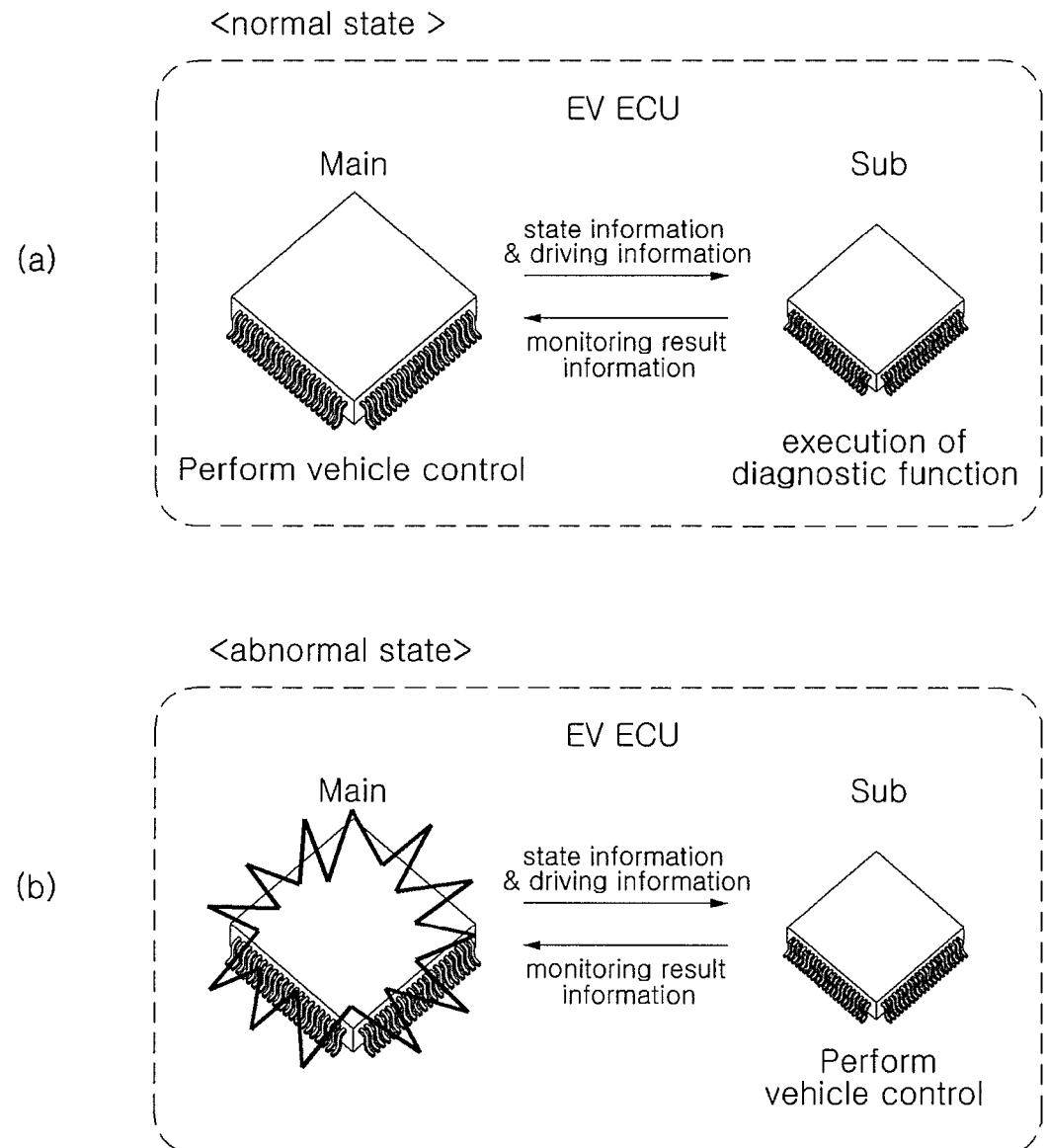
FIG. 5 is a conceptual diagram illustrating functions of a main ECU and a sub ECU according to an embodiment of the present invention.

FIG. 5 is a conceptual diagram illustrating functions of a main ECU and a sub ECU according to an embodiment of the present invention.

Referring to FIG. 5, the main ECU 110 and the sub ECU 120 communicate with each other to perform mutual monitoring therebetween. Specifically, the sub ECU 120 monitors a current state of the main ECU 110 so that it determines whether a malfunction occurs in the main ECU 110.

In the case of a normal state shown in FIG. 5(*a*), the main ECU 110 performs functions for vehicle control, and the main ECU 110 outputs state information and driving information to the sub ECU 120.

The sub ECU 120 analyzes data received from the main ECU 110 so as to perform a diagnostic function of the main ECU 110, and outputs the monitoring result to the main ECU 110. The sub ECU 120 calculates torque information for motor control in response to an input signal from the sensor unit 130, and outputs the calculated torque information to the main ECU 110, so that the torque information of the sub ECU 120 is compared with torque information of the main ECU 110.

On the other hand, if a malfunction occurs in the main ECU 110 as shown in FIG. 5(*b*), the sub ECU 120 performs vehicle control, instead of the main ECU 110, in response to state information and driving information. In this case, the sub ECU 110 immediately performs emergency control using pre-calculated torque information.

The sub ECU 120 performs necessary functions, for example, motor control, acceleration control and deceleration control according to vehicle driving states, instead of performing all functions of the main ECU 110.

In this case, the sub ECU 120 monitors the main ECU 110. If the main ECU 110 normally operates, it releases emergency control, enables the main ECU 110 to perform vehicle control, and performs a diagnostic function of the main ECU 110. However, the sub ECU 120 maintains emergency control during vehicle traveling although the main ECU 110 is in a normal state. If the electric vehicle stops or is powered off, the sub ECU 120 enables the electric vehicle to be normally controlled by the main ECU 110 in a subsequent driving action.

Figure 6:
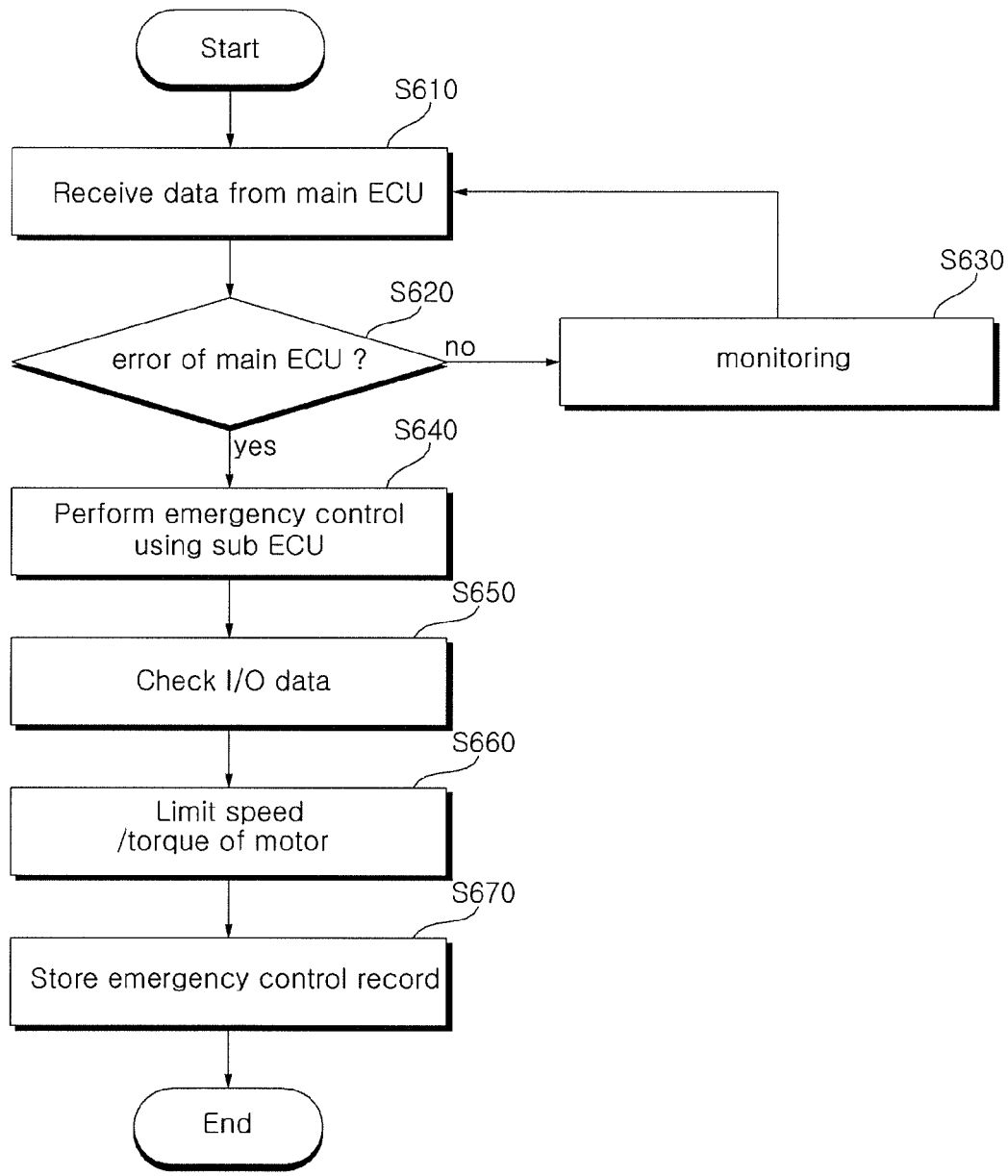
FIG. 6 is a flowchart illustrating a method for performing emergency control driving between a main ECU and a sub ECU of FIG. 5.
Figure 7:
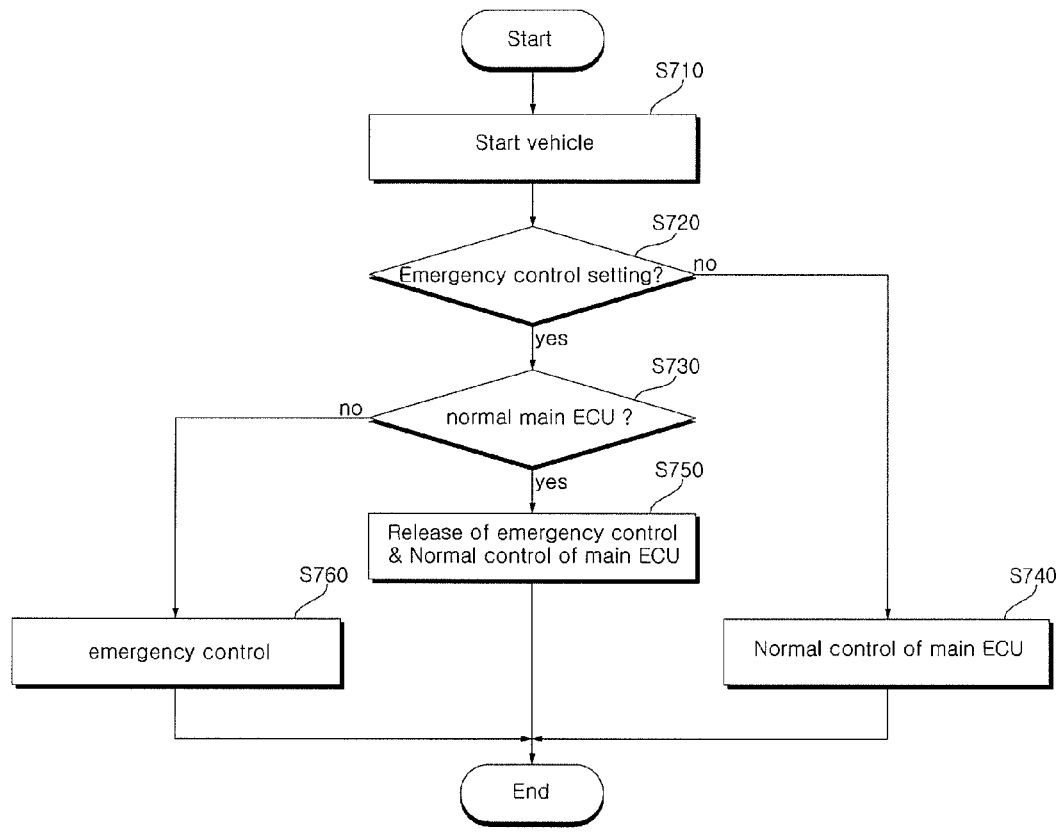
FIG. 7 is a flowchart illustrating a method for releasing emergency control shown in FIG. 6.

FIG. 6 is a flowchart illustrating another example of an emergency control driving method according to an embodiment of the present invention. FIG. 7 is a flowchart illustrating a method for releasing emergency control shown in FIG. 6.

Referring to FIG. 6, the sub ECU 120 communicates with the main ECU 110 when the electric vehicle starts driving in step S610. The sub ECU 120 determines whether input data is received from the main ECU 110, monitors a current state of the main ECU 110 by analyzing the input data, and performs a diagnostic function to determine whether the main ECU 110 normally operates in step S620.

The sub ECU 120 checks a communication state between the sub ECU 120 and the main ECU 110, so that it can self-calculate torque information in response to an input signal from the sensor unit 130. In this case, the sub ECU 120 and the main ECU 110 calculate torque information, respectively, and output the calculated torque information to the MCU 150.

If the main ECU 110 normally operates, the sub ECU 120 outputs the monitoring result of the main ECU 110, and periodically checks data received from the main ECU 110 in such a manner that the sub ECU 120 can monitor the main ECU 110 in step S630.

If a malfunction occurs in the main ECU 110, the sub ECU 120 determines that the main ECU 110 abnormally operates so that it performs emergency control of the vehicle in step S640.

The sub ECU 120, instead of the main ECU, performs the vehicle control function that has been performed by the main ECU 110 in an emergency control mode. In this case, the sub ECU 120 performs emergency control using the pre-calculated torque information.

The sub ECU 120 outputs torque information to the MCU 150 even when the main ECU 110 normally operates. In the case of the emergency control mode, the sub ECU 120 controls the MCU 150 to immediately use torque information of the sub ECU 120.

The sub ECU 120 checks I/O data in step S650, and controls the corresponding operation after establishing vehicle limitation in response to current state and driving information of the vehicle in step S660.

For example, the sub ECU 120 starts operating the vehicle by driving the motor 170, limits a maximum speed, and enables the vehicle to be operated within a limited range without exceeding the limited value. The sub ECU 120 further limits torque in the same manner as the speed, such that it controls the vehicle under the limited speed and torque.

Therefore, the vehicle can operate with limited functionality through emergency control.

In this case, the sub ECU 120 enables the output unit of the interface unit 140 to display specific information indicating that the vehicle operates in an emergency driving mode. For example, the output unit of the interface unit 140 may be an information message or indicator lamp indicating such emergency driving.

In this case, the sub ECU 120 records a variety of information of the vehicle under emergency control as logarithmic data in step S670. For example, vehicle driving history, setting values established during vehicle driving, etc. may be recorded as logarithmic data in step S670.

If the sub ECU 120 performs emergency control due to malfunction of the main ECU 110, it maintains the emergency control until the vehicle stops or is powered off.

Referring to FIG. 7, under the condition that the vehicle starts operating in step S710, if emergency control is established in step S720, the sub ECU 120 determines whether the main ECU 110 normally operates in step S730.

In this case, under the condition that the vehicle starts operating, if the main ECU 110 is the last vehicle control ECU in the previous driving action, the above-mentioned decision is achieved by the main ECU. If the vehicle is controlled by the sub ECU 120, vehicle starting processing and the above-mentioned decision may be achieved by the sub ECU 120.

In this case, if emergency control is not established when the vehicle starts operating, the main ECU 110 normally operates, such that the vehicle is normally controlled by the main ECU 110 in step S740.

On the other hand, if the sub ECU 120 determines that the main ECU 110 normally operates under emergency control, the sub ECU 120 releases the emergency control and enables the vehicle to be normally controlled by the main ECU 110 in step S750.

If the emergency control is released, the main ECU performs vehicle control, and the sub ECU 120 monitors the main ECU 110. If the emergency control is released, emergency control limitations of vehicle speed and torque established are also released.

Under the condition that the emergency control is established, if a malfunction occurs in the main ECU 110, i.e., if the malfunction of the main ECU 110 is not released, the sub ECU 120 maintains emergency control in step S760. In this case, the sub ECU 120 enables the output unit of the interface unit 140 to indicate the malfunction of the main ECU 110, such that it enables a vehicle driver to recognize the need to check and repair the main ECU 110.

Therefore, according to the electric vehicle and an emergency control method thereof, although a malfunction occurs in the main ECU, the electric vehicle can immediately recognize malfunction of the main ECU through the sub ECU, so that emergency driving of the vehicle can be performed through a backup of the sub ECU in such a manner that the vehicle can be minimally driven. Therefore, although a malfunction occurs in the main ECU, the embodiment prevents the electric vehicle from abruptly stopping, enables the vehicle to be limitedly driven, and guarantees driving safety by establishing some limit values.

Figure 8:
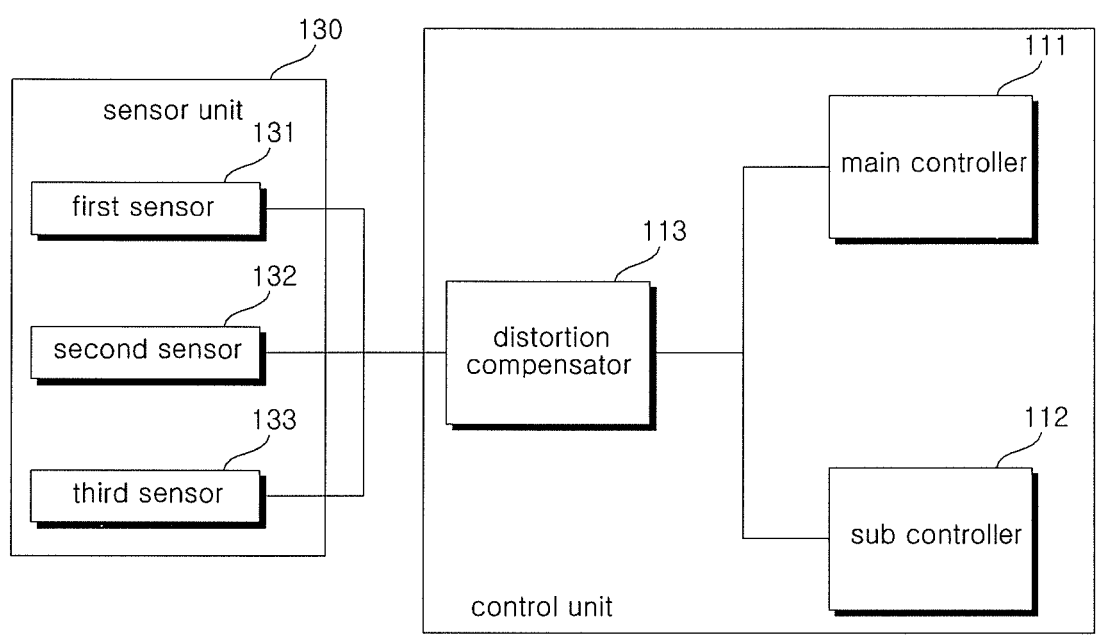
FIG. 8 is a block diagram illustrating constituent components of an electric vehicle according to another embodiment of the present invention.

FIG. 8 is a block diagram illustrating constituent components of an electric vehicle according to another embodiment of the present invention.

The electric vehicle includes a plurality of controllers shown in FIG. 1, each of which includes a plurality of processors as shown in FIG. 8. In addition, the distortion compensator can also be applied to a plurality of controllers shown in FIG. 1. Constituent components of the electric vehicle shown in FIG. 8 are denoted by the same numerals as those of FIG. 1, and as such a detailed description thereof will herein be omitted for convenience of description.

The control unit of the electric vehicle includes a plurality of processors, such that the vehicle can be controlled through mutual data exchange and monitoring.

The control unit includes a main controller 111, a sub controller 112, and a distortion compensator 113.

The main controller 111 controls the principal operations for vehicle control, and outputs a predetermined command to the MCU 150 in a manner that a predetermined operation corresponding to input signals of the interface unit 140 and the sensor unit 130 is performed, such that the main controller 111 enables an operation state to be displayed under the control of data I/O operations. In addition, the main controller 111 monitors operation states of the sub controller 112 and the MCU 150.

The sub controller 112 is connected to the main controller 111 so as to receive I/O signals from the main controller 111, and monitors the main controller 111. In this case, the sub controller 112 determines whether the main controller 111 normally operates in response to values, formats, and I/O time of the I/O signals.

The sub controller 112 calculates torque information to be applied to the MCU 150 on the basis of an input signal from the sensor unit 130, outputs the calculated torque information to the main controller 111 and the motor controller 150, and compares the torque information with a value calculated by the main controller 110. If a malfunction occurs in the main controller 111, the sub controller 112 operates as a backup controller in place of the main controller 111. That is, the sub controller 120 controls operations of the motor and the electric vehicle using input data.

The main controller 111 and the sub controller 112 are configured to perform mutual monitoring therebetween, and determine whether a malfunction occurs in any one thereof. If a malfunction occurs in any one of the main controller 111 and the sub controller 112, the normally operated controller controls the vehicle, and outputs an error message indicating the occurrence of a malfunction through the output unit of the interface unit 140.

The main controller 111 and the sub controller 112 receive the same signal as input, and generate data for vehicle control through independent processing. Data generated from the main controller 111 is compared with data generated from the sub controller 112, and the main controller 111 determines whether a malfunction occurs in the sub controller 112 and the sub controller 112 determines whether a malfunction occurs in the main controller 111.

In this case, input values from a plurality of sensors 131 to 133 of the sensor unit 130 are respectively input to the main controller 111 and the sub controller 112 in such a manner that processing can be achieved on the basis of the same signal.

When signals are input to the main controller 111 and the sub controller 112, signal distortion occurs or an unexpected problems occurs in signal transmission, such that signals to be input to the main controller 111 and the sub controller may be different from each other.

The distortion compensator 113 compensates for distortion generated in input signals (i.e., input signals from the sensors 131 to 133 of the sensor unit 130) of the main controller 111 and the sub controller 112, such that the same signal is input to the main controller 111 and the sub controller 112.

The distortion compensator 113 includes at least one resistor. In addition, the distortion compensator 113 is coupled to each of the main controller 111 and the sub controller 112 through at least one resistor having a predetermined size.

The resistor contained in the distortion compensator 113 may be pre-established in consideration of characteristics of a plurality of sensors.

If necessary, a variable resistor may be used as the resistor of the distortion compensator 113, such that a value of the variable resistor is changed according to an input signal (indicating which sensor outputs data to the resistor) or unique characteristics of a sensor connected thereto.

In this case, the distortion compensator 113 may further include a resistance setting unit for setting a value of the variable resistor such that the value of the variable resistor can be changed according to a sensor for signal input.

In order to input the same signal to the main controller 111 and the sub controller 112 through the distortion compensator 113, the main controller 111 and the sub controller 112 are established as follows.

The same AC check mode is established in the main controller 111 and the sub controller 112. In this case, a floating check state in which a value of the input signal is read without change is established in the AD check mode.

In this case, if the main controller 111 and the sub controller are established in different ways, for example, provided that the AD check mode of the main controller 111 is set to a pull-up check state in which signals are processed on the basis of a reference voltage and the AD check mode of the sub controller 112 is set to a pull-down check state in which signals are processed on the basis of a ground, the main controller 111 is substantially coupled to the sub controller 112 through the distortion compensator 113, and a circuit configured to interconnect the main controller 111 and the sub controller 112 is contained in the controller, so that distortion may occur in the input signal.

In contrast, if the AD check mode of the main controller 111 is set to a pull-down check state and the AD check mode of the sub controller 112 is set to a pull-up check state, a circuit for interconnecting the sub controller 112 and the main controller 111 is formed, resulting in the occurrence of signal distortion.

Although the same check mode (pull-up or pull-down) is established in the main controller 111 and the sub controller 112, since the main controller 112 is coupled to the sub controller 112, the main controller 111 and the sub controller 112 may affect each other as soon as the AD check starts operation, such that input signals may be distorted due to a pull-up resistor and a pull-down resistor.

In order to minimize signal distortion, the main controller 111 and the sub controller 112 may be set not only to the AD check mode but also to the floating state.

In this case, the main controller 111 and the sub controller 112 may be manufactured by the same manufacturer or may be implemented with the same-series processors. Preferably, a specific processor capable of establishing the AD check mode may be used.

If an external signal unit of the controller is open, for example, if the sensor is open, this means no input signal, so that an input signal of 0V must be input to the main controller 111 and the sub controller 112. As a result, if the AD check mode of each of the main controller 111 and the sub controller 112 is set to the floating check state, a different value than 0V may be input to the main controller 111 and the sub controller 112.

Accordingly, if the AD check mode of each of the main controller 111 and the sub controller 112 is set to the floating check state as described above, the distortion compensator 113 interposed among the main controller 111, the sub controller 112, and the sensor unit 130 is composed of a pull-down based resistor.

If resistor connection is achieved within the distortion compensator 113 as described above, voltage floating caused by the open sensor is prevented. In this case, a resistance value of the resistor may be experimentally set to a specific resistance at which no distortion occurs in an input signal.

Because a signal is input to the main controller 111 and the sub controller 112 through the distortion compensator 113, although a unit connected to an external part of the controller is open, a signal applied to the main controller 111 and the sub controller 112 is kept at 0V by the distortion compensator 113.

Preferably, the main controller 111 and the sub controller 112 may be established in a manner that their AD check timing points do not overlap.

Each of the main controller 111 and the sub controller further includes a filter. If the AC check timing point of the main controller 111 overlaps with that of the sub controller 112, instantaneous signal change may occur, and a filtering operation is carried out in proportion to such instantaneous signal change.

Figure 9:
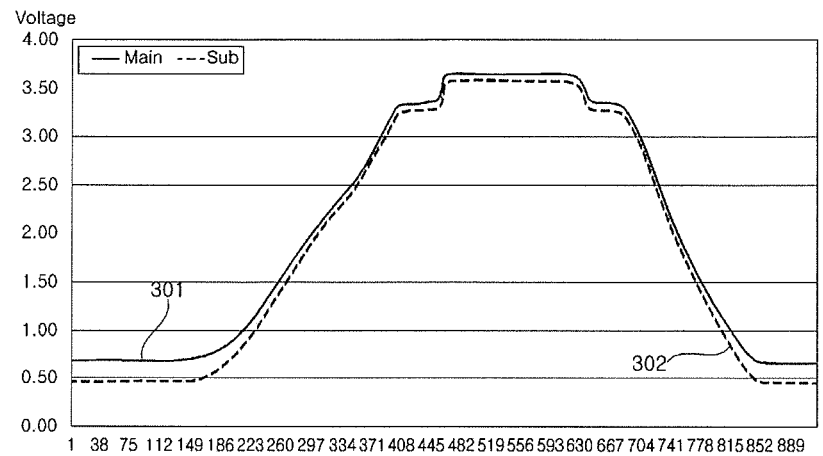
FIG. 9 illustrates examples of input signals needed when AD check modes of a main controller and a sub controller of FIG. 8 are established.
Figure 9:
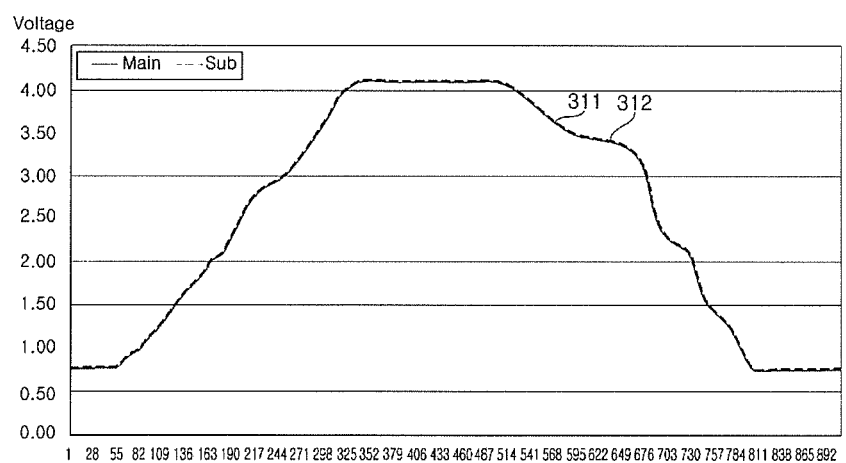

FIG. 9 illustrates examples of input signals needed when AD check modes of the main controller and the sub controller of FIG. 8 are established. FIG. 9(*a*) illustrates exemplary distorted signals, and FIG. 9(*b*) illustrates an example of a normal signal input to the main controller and the sub controller through signal distortion compensation.

As described above, according to the AD check mode setting of the main controller 111 and the sub controller 112, distortion may occur in a signal input to the main controller 111 and the sub controller 112.

If the AD check mode setting of the main controller 111 is different from that of the sub controller 112, signal difference may occur as shown in FIG. 3(*a*). The first signal 301 is input to the main controller 111, and the second signal 302 is input to the sub controller 112.

If the AD check mode of the main controller 111 is different from that of the sub controller 112, signal differences (305, 306, 307) occur in the first signal 301 and the second signal 302. If the signal differences (305, 306, 307) are constant, the signal differences 305 to 307 may be identical to each other through signal compensation. However, if sections where such differences are generated are not constant as shown in FIG. 9 and the generated differences have different sizes, it becomes difficult to perform processing of such differences using the same signal.

On the other hand, as shown in FIG. 9(*b*), if the AD check mode corresponding to the floating check mode is established in the main controller 111 and the sub controller 112, a third signal 311 being input to the main controller 111 is identical to a fourth signal 312 input to the sub controller 112.

Therefore, since the main controller 111 and the sub controller 112 receive the same input signals and process the received signals, they mutually check their operation states so as to stably perform normal control of the vehicle, such that it is determined which one of the main controller 111 and the sub controller 112 has malfunctioned.

Figure 10:
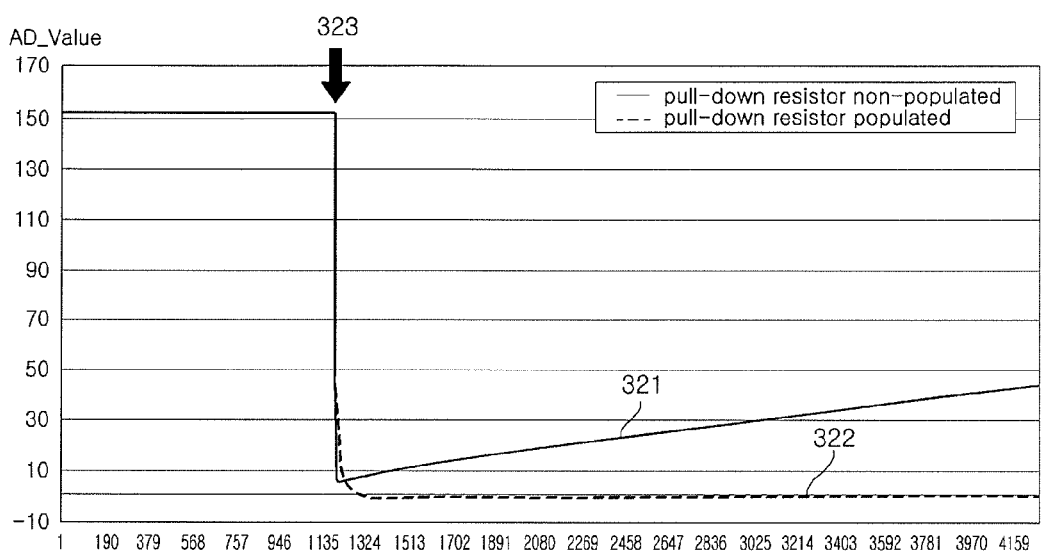
FIG. 10 illustrates a method for inputting a normal signal through a distortion compensator from among constituent components of the electric vehicle of FIG. 8.

FIG. 10 illustrates a method for inputting a normal signal through the distortion compensator from among constituent components of the electric vehicle of FIG. 8. In this case, the third signal 321 is used when the distortion compensator is not contained in the electric vehicle, and the fourth signal 322 is used when the distortion compensator is contained in the electric vehicle.

Although the AD check mode corresponding to the floating check state is established in the main controller 111 and the sub controller 112, if the distortion compensator 113 is not contained in the electric vehicle, signal distortion occurs in the third signal 321.

If the distortion compensator 113 is not present in the control unit, if an external unit of the control unit is open, if signal input is interrupted, or if the sensor is open as shown in 323, an input signal of 0V must be input to the main controller 111 and the sub controller 112, and a voltage recognized by the main controller 111 and the sub controller 112 gradually increases as shown in the fifth signal 321, instead of being set to 0V.

In this case, the main controller 111 and the sub controller 112 misunderstand that a predetermined signal is input, such that the vehicle is improperly controlled by the main controller 111 and the sub controller 112, resulting in vehicle malfunction.

On the other hand, if the distortion compensator 113 is contained in the control unit, a voltage recognized by each of the main controller 111 and the sub controller 112 is kept at 0V as shown in the sixth signal 322 although the external unit or the sensor is open at the position 323.

As is apparent from the above description, an internal AD check mode of each of the main controller and the sub controller of the control unit including a plurality of processors is set to a floating check state, and the control unit includes the distortion compensator for signal compensation in such a manner that signals input to a plurality of processors can be adjusted to be substantially identical to each other and the control unit can recognize an open circuit state.

As a result, the electric vehicle is controlled through processing of a plurality of processors on the basis of the same signal, such that the efficiency of vehicle control is increased and stability of vehicle traveling is guaranteed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An electric vehicle comprising:
   a sensor unit for measuring a vehicle state;
   an interface unit for receiving vehicle control setting parameters from a vehicle driver;
   a main controller for operating and controlling the electric vehicle in response to input data from the sensor unit and the interface unit; and
   a sub controller for diagnosing the main controller in response to state information and driving information received from the main controller, and performing emergency control of the vehicle when a malfunction occurs in the main controller, instead of the main controller,
   wherein the sub controller, under the emergency control, controls acceleration and deceleration of the vehicle, establishes a limit range of speed and torque of the vehicle, and controls the vehicle to be driven en within the limit range.

2. The electric vehicle according to claim 1, wherein the sub controller calculates torque information for motor control in response to an input signal of the sensor unit, and immediately performs, when a malfunction occurs in the main controller, emergency control of the vehicle using the torque information in such a manner that the vehicle does not stop moving.

3. The electric vehicle according to claim 2, wherein the sub controller, under the emergency control, calculates the torque information even when the main controller normally operates and outputs the calculated torque information to a motor controller in such a manner that the vehicle is continuously driven without being stopped.

4. The electric vehicle according to claim 1, wherein the sub controller, under the emergency control, records driving history information, driving setting information, and vehicle state information generated in the emergency control, as logarithmic data.

5. The electric vehicle according to claim 1, wherein the sub controller, under the emergency control, when the vehicle stops operation and is then restarted, determines whether the main controller normally operates, releases the emergency control when the main controller normally operates, and enables the main controller to perform vehicle control.

6. The electric vehicle according to claim 1, further comprising:
a motor control unit for allowing the vehicle to travel by controlling a motor; and
a power relay assembly (PRA) for providing battery power to the motor control unit,
wherein, when a malfunction occurs in the motor control unit, the main controller and the sub controller control the power relay assembly (PRA) so as to prevent the battery power from being applied to the motor control unit, such that the vehicle performs emergency stop.

7. The electric vehicle according to claim 6, wherein the power relay assembly (PRA) switches a relay in response to a cut-off signal received from the main controller or the sub controller, such that power supplied to the motor control unit via the relay is cut off.

8. The electric vehicle according to claim 6, wherein control information generated from the main controller is compared with control information generated from the sub controller through mutual transmission between the main controller and the sub controller, when there is a difference in control information between the main controller and the sub controller, this means a control disabled state, such that an operation stop command is applied to the motor control unit.

9. The electric vehicle according to claim 6, wherein:
when there is a difference in input control information between the main controller and the sub controller, this means that a malfunction occurs in at least one of the main controller and the sub controller, such that the motor controller stops driving the motor; and
when no control signal is received from any one of the main controller and the sub controller, the motor control unit determines that the corresponding controller does not operate such that a signal indicating the malfunction is input to the normally operating controller.

10. The electric vehicle according to claim 1, further comprising:
a distortion compensator for compensating for distortion of signals received from a plurality of sensors contained in the sensor unit in such a manner that the same signal is input to the main controller and the sub controller.

11. The electric vehicle according to claim 10, wherein the distortion compensator is connected to each of the main controller and the sub controller through at least one resistor, such that input signals from the plurality of sensors are applied to the main controller and the sub controller.

12. The electric vehicle according to claim 10, wherein an AD check mode corresponding to a floating check state in which a value of an input signal is read without change is established in the main controller and the sub controller.

13. The electric vehicle according to claim 12, wherein the distortion compensator, when the plurality of sensors or an external unit connected to the distortion compensator is open, performs signal compensation in such a manner that a voltage recognized by the main controller and the sub controller becomes 0V.

14. The electric vehicle according to claim 12, wherein the distortion compensator includes at least one resistor based on a pull-down scheme.

15. The electric vehicle according to claim 14, wherein the distortion compensator includes a variable resistor having a resistance value changing according to a sensor connected thereto.

16. A method for performing emergency control of an electric vehicle comprising:
diagnosing a state of the main controller upon receiving state information and driving information from the main controller configured to control the vehicle;
transmitting, upon diagnosing that the main controller normally operates, a monitoring result to the main controller; and
establishing emergency control, upon diagnosing that a malfunction occurs in the main controller, and performing vehicle control without using the main controller,
wherein, when the emergency control is established, a limited range of torque and speed of the vehicle is established in response to the state information and the driving information and acceleration and deceleration of the vehicle are limited such that the vehicle performs emergency driving.

17. The method according to claim 16, further comprising:
before establishing the emergency control, calculating torque information for motor control on the basis of an input value of a sensor,
when the emergency control is established, performing the vehicle control on the basis of the calculated torque information.

18. The method according to claim 16, further comprising:
during the emergency control, persistently monitoring the main control unit, if the main controller normally operates, maintaining the emergency control until the vehicle stops moving or is turned off, and releasing the emergency control in a subsequent driving action such that vehicle control is performed by the main controller.

19. A method for performing emergency control of an electric vehicle comprising:
generating, by each of the main controller and the sub controller, control information for vehicle control according to input data from at least one sensor, and outputting the generated control information to a motor control unit;
determining whether a malfunction occurs in the motor control unit according to whether there is a response from the motor control unit;
when the motor control unit normally operates, allowing control information to be communicated between the main controller and the sub controller, comparing the received control information with the generated control information, and outputting an operation stop command to the motor controller when there is a difference in control information between the main controller and the sub controller; and when a malfunction occurs in the motor control unit, cutting off power supplied to the motor control unit through power relay assembly (PRA) control such that the vehicle performs emergency stop.

20. The method according to claim 19, wherein a relay contained in the power relay assembly (PRA) is turned off in response to a cut-off signal that is applied from at least one of the main controller and the sub controller to the power relay assembly (PRA) and power supplied from the battery to the motor control unit is cut off so that the vehicle performs emergency stop.

21. The method according to claim 19, further comprising:
when the motor control unit normally operates, reducing speed of the vehicle by controlling the motor using the motor control unit in response to the operation stop command, and performing emergency stop of the vehicle by stopping the motor.

22. The method according to claim 19, further comprising:
when the motor control unit normally operates, comparing, by the motor control unit, control information of the main controller with control information of the sub controller, and determining a control disabled state when there is a difference in control information between the main controller and the sub controller.

* * * * *